United States Patent [19]

Tsujimoto et al.

[11] 3,963,429
[45] June 15, 1976

[54] COLORING OF ORGANIC MATERIALS WITH ASYMMETRIC THIOINDIGOID COMPOUNDS

[75] Inventors: Michihiro Tsujimoto, Tachikawa; Kisuke Osawa, Yokohama; Ichiro Okubo, Hachioji, all of Japan

[73] Assignee: Mitsui Toatsu Chemicals, Incorporated, Tokyo, Japan

[22] Filed: Jan. 9, 1974

[21] Appl. No.: 431,696

[30] Foreign Application Priority Data

Jan. 17, 1973 Japan.................................. 48-7012
May 22, 1973 Japan.............................. 48-56328

[52] U.S. Cl.......................................... 8/38; 8/179; 260/332
[51] Int. Cl.² ............................................... D06P 1/22
[58] Field of Search ................... 8/38, 179; 260/332

[56] References Cited
UNITED STATES PATENTS

| | | | |
|---|---|---|---|
| 2,096,140 | 10/1937 | Stocker et al. | 8/38 X |
| 2,882,277 | 4/1959 | Mueller | 8/38 X |
| 3,793,341 | 2/1974 | Genta | 260/332 X |

Primary Examiner—Lewis T. Jacobs
Attorney, Agent, or Firm—Sherman & Shalloway

[57] ABSTRACT

Method of coloring a synthetic or semisynthetic organic high molecular weight material with a asymmetric thioindigoid compound having the formula

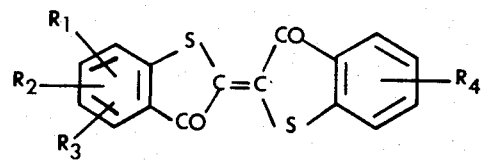

wherein $R_1$, $R_2$ and $R_3$ may be the same or different and are selected from the group consisting of a hydrogen atom, chlorine atom, lower alkyl group, lower alkoxy group, cyclohexyl group, phenyl group, benzyl group and styryl group, the benzene nucleus of the phenyl and benzyl group may be optionally substituted with a methyl group or chlorine atom, $R_1$ and $R_2$ may together form a tetramethylene ring, $R_4$ is a hydrogen atom or methyl group with the proviso that $R_4$ is a methyl group when $R_1$, $R_2$ and $R_3$ are each a hydrogen atom and $R_4$ is a hydrogen atom when $R_1$ is a methyl group and $R_2$ and $R_3$ are each a hydrogen atom. The colored organic high molecular weight materials exhibit brilliant nuance with characteristic fluorescence.

24 Claims, No Drawings

COLORING OF ORGANIC MATERIALS WITH ASYMMETRIC THIOINDIGOID COMPOUNDS

BACKGROUND OF THE INVENTION

This invention relates to a method for coloring synthetic or semisynthetic organic high molecular weight materials with asymmetric thioindigoid compounds. Although it has been hitherto well known to use thioindigoid compounds as dyestuffs for natural organic materials (for example, cotton), it has been scarcely known to use them as colorants for synthetic or semisynthetic organic high molecular weight materials. Recently, brilliant nuance has been desired in colored articles, especially in weaving apparel, and polyester materials colored with ordinary dyestuffs for polyester show a duller hue than the other colored synthetic organic materials (for example, polyacrylonitrile fabrics). Thus, brilliant dyestuffs for polyester materials have been sought.

This is also testified by the invention of "cationic dye-dyeable polyester" that shows more brilliant hue by dyeing with cationic dyes than the ordinary polyester materials dyed with ordinary dyes for polyester. On the other hand, the thioindigoid compounds show brilliant coloring effects but little dyeability for polyester materials, and thus thioindigoid dyes for polyesters have scarcely been known except that unsubstituted thioindigo is applied only in limited uses.

As a result of intensive colorant tests of organic materials on the thioindigoid compounds, we discovered that compounds of formula (I) to be defined hereinbelow color synthetic organic high molecular weight compounds, especially polyester materials, in brilliant nuance with characteristic fluorescence, and thus completed the invention. Besides, recently α-aminoanthraquinone, the most important intermediate for reddish diperse anthraquinone dyes, has caused difficult problems on environmental pollution because of using a mercury catalyst for manufacturing it. In contrast the thioindigoid compounds used in this invention can be obtained without using mercury and can develop color in more brilliant nuance than the anthraquinone derivatives. We believe therefore that the industrial merit of this invention is great.

SUMMARY OF THE INVENTION

This invention relates to a method of coloring a synthetic or semisynthetic organic high molecular weight material with an asymmetric thioindigoid compound having the formula:

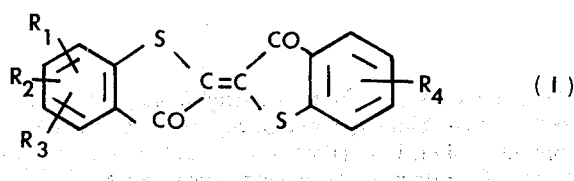

wherein $R_1$, $R_2$ and $R_3$ may be the same or different and are selected from the group consisting of a hydrogen atom, chlorine atom, lower alkyl group, lower alkoxy group, cyclohexyl group, phenyl group, tolyl group, chlorophenyl group, benzyl group, methylbenzyl group, chlorobenzyl group, and styryl group, $R_1$ and $R_2$ may together form a tetramethylene ring, $R_4$ is a member selected from the group consisting of a hydrogen atom and methyl group with the proviso that $R_4$ is a methyl group when $R_1$, $R_2$ and $R3$ are each a hydrogen atom and $R_4$ is a hydrogen atom when $R_1$ is a methyl group and $R_2$ and $R_3$ are each a hydrogen atom.

The synthetic or semisynthetic organic high molecular weight materials which can be colored according to the present invention include any synthetic or semisynthetic high molecular weight compound which can be practically used as fibrous article, extrudate, casting or molded article including synthetic or semisynthetic resins such as amino-formaldehyde resin, for example, urea-formaldehyde resin, polymers and copolymers of methacrylic acid esters, polymers and copolymers of vinyl chloride, polymers and copolymers of vinylidene chloride, polymers and copolymers of olefins, for example, polyethylene and polypropylene, styrene polymers and copolymers, polyamide resins, polyester resins, polyacrylic resins, polyacetal resins and cellulose esters, especially polyester resins.

DETAILED DESCRIPTION OF THE INVENTION

Thioindigoid compounds have previously been well known as vat dyes and applied to the dyeing of cellulose fibers, but for dyeing of man made fibers, especially, polyester fibers, they have little dyeability. Therefore, to treat polyester fibrous articles with the hitherto known thioindigoid compounds by conventional exhausting method in aqueous medium has shown little effect and has been practically useless.

The asymmetric thioindigoid compounds of formula (I) have scarcely been known. We, as a result of the intensive colorant test on the organic materials with the thioindigoid compounds, discovered that the compounds of formula (I) color synthetic organic high molecular weight compounds, especially polyester materials in brilliant nuance with characteristic fluorescence, and thus completed the invention. According to our test, the asymmetric thioindigoid compound has a lower melting point, a higher solubility in organic solvents, and a higher molecular absorption coefficient in solutions than the correlated symmetric thioindigoid compound. Particularly, it is observed that the compound of formula (I) has much higher dyability to polyester materials than the correlated symmetric thioindigoid compound.

These discoveries are not anticipated from the facts known heretofore. The compounds of the formula (I), having a good affinity for polyester materials, can be applied by the same procedures as those applied with the ordinary disperse dyestuffs for polyester materials, color the articles in brilliant nuance ranging from reddish orange to violet shade with fluoresence, and various fastness characteristics of the dyed articles are excellent.

Besides, the substituent such as a phenyl group, benzyl group or styryl group ameliorates the sublimation fastness, enhances the applicability in high temperature use, for example, in fixing of the colorant at high temperature steaming process.

In table 1, are shown the several properties of symmetric and asymmetric compounds and in table 2 are exemplified the properties of the compound and polyester fiber "Tetoron" dyeings on exhausting method at 130°C. for 40 minutes in aqueous medium.

Table 1

| Structure | Maximum absorption wave length (mμ, in DMF-CH₃OH solution) | Molecular absorption coefficient (at max.) | Melting point (°C.) | Maximum* fluorescence wave length |
|---|---|---|---|---|
| [structure with two CH₃ groups] | 545 | 13,100 | 300 | 580 |
| [structure with two CH₃ groups] | 542 | 14,350 | 261.5 – 262.5 | 572 |

*in benzene solution, mμ.

Table 2

| Structure | Dyeability | Fastnesses of Dyeings Sublimation[a] | Light[b] | Melting Point (°C.) |
|---|---|---|---|---|
| [structure] | low (no more than (0.1% owf) | 1–2(0.1% owf)[c] | 5 | 290–291 |
| [structure with H₃C and CH₃] | low | 2–3(0.1% owf) | 5 | 299–301 |
| [structure with CH₃] | high (obtained in deep pink shade) | 2–3(0.6% owf) | 5 | 279–281 |
| [structure with CH₂-phenyl] | high (obtained in deep pink shade) | 3–4(0.6% owf) | 5 | 218–220 |

[a] JIS L 0879-1968 B,
[b] JIS L 0842-1971
[c] dyeing depth of the measured specimen. Sublimation fastness is poorer in higher depth.

The asymmetric thioindigoid compounds of the invention are easily synthesized by known method as follows:

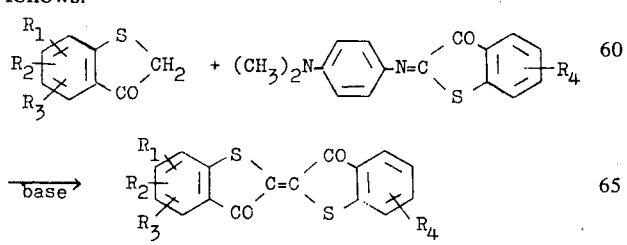

thus, for example, from 6-phenylthionaphthenone-3 and 2-(4'-dimethylaminophenylimino)thionaphthenone-3 6-phenylthioindigo (m.p. 213°–215°C) is obtained. Therefore, we think there is no need to describe the synthesizing method of the compounds of the formula (I) specifically. In Table 3, the typical examples of the compounds used for this invention are shown although the present invention is not limited thereto. The shade of polyester fabric dyed therewith using a dyeing procedure such as that described in Example 1 or 2, is specified.

Table 3
| Compound No. | Structural formula | Shade of the polyester dyed article |
|---|---|---|
| 1 | 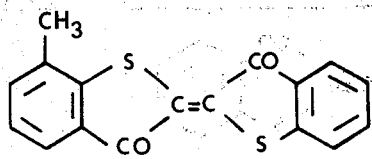 | Pink Pink |
| 2 | 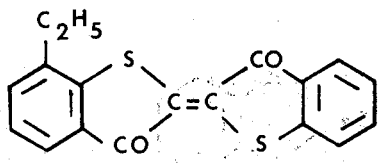 | Ditto |
| 3 | 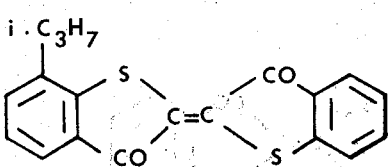 | Ditto |
| 4 | 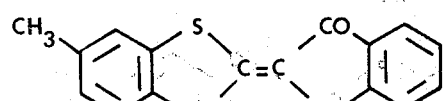 | Ditto (more reddish than No. 1) |
| 5 | 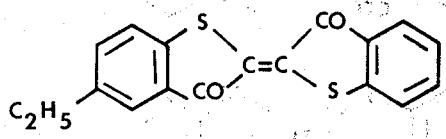 | Red-Violet |
| 6 | 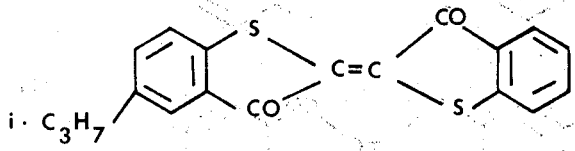 | Ditto |
| 7 | 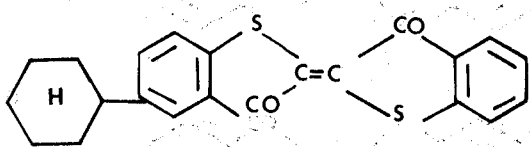 | Ditto |
| 8 | 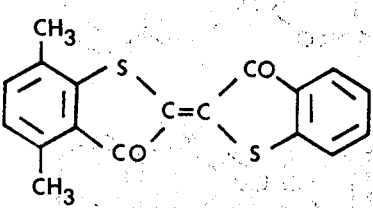 | Bluish-Pink |
| 9 | 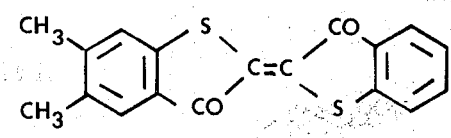 | Red-Violet |
| 10 | 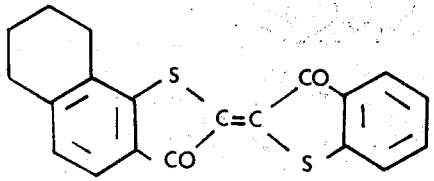 | Red |

Table 3-continued

| Compound No. | Structural formula | Shade of the polyester dyed article |
|---|---|---|
| 11 | | Red-Violet |
| 12 | | Red |
| 13 | | Pink |
| 14 | | Pink |
| 15 | | Ditto |
| 16 | | Ditto |
| 17 | | Ditto |
| 18 | | Ditto |
| 19 | | Bluish-Pink |

Table 3-continued

| Compound No. | Structural formula | Shade of the polyester dyed article |
|---|---|---|
| 20 | | Ditto |
| 21 | | Bluish-Pink |
| 22 | | Red-Violet |
| 23 | | Ditto |
| 24 | | Pink |
| 25 | | Reddish-Orange |
| 26 | | Ditto |
| 27 | | Ditto |
| 28 | | Red-Violet |

Table 3-continued

| Compound No. | Structural formula | Shade of the polyester dyed article |
|---|---|---|
| 29 | | Dark Violet |
| 30 | | Red-Violet |
| 31 | | Violet-Red |
| 32 | | Ditto |
| 33 | | Violet |
| 34 | | Ditto |
| 35 | | Pink |
| 36 | | Violet-Red |

Organic materials can be easily colored with the compounds of the formula (I) by any ordinarily practiced method. For example, a fibrous material, such as yarns and fabrics, can be colored by fixing it, at 50° to 140°C, in an aqueous medium by the conventional exhausting method, at 100° to 150°C by the conventional printing with saturated steam (applicable 150° to 180°C super-heated steam), or at a proper temperature (100° to 220°C) consistent with the type of fiber using dry heat by the conventional thermosol method.

When the organic material to be colored is a film, coating, casting or a molded or extruded article, it can be colored by admixing the compound of the formula (I) with a resin or polymer from which such an article is made, during the preparation of such a resin or polymer, or before it is used to form such an article, or during the formation of such a resin into the article. Also, a resin based pigment having reddish orange to violet shade with fluorescence can be obtained by mixing the compounds of the formula (I) into the resin or polymer or other properly selected organic materials in molten form.

The following examples are presented in which all parts are on a weight basis and the compound numbers refer to the compounds described in Table 3.

EXAMPLE 1

1 part of compound No. 16 (6-Benzyl thioindigo) was ground together with 0.5 part of a sodium alkyl benzene sulfonate type or alkylarylpolyoxyethylene ether type surface active agent and 2 parts of water for a sufficient time to provide a finely granulated powder which was diluted with water to provide 10 parts of a finely granulated aqueous dispersion. 0.2 part of this dispersion was added to an aqueous bath containing 1 part of a higher alcohol sulfate type surface active agent to provide 500 parts of a treating bath. 10 parts of a polyester cloth was immersed in this treating bath maintained at 130°C. for 40 minutes and was water-washed and dried. The dyed cloth showed a clear pink color having a red fluorescence and its light fastness was the 5th grade (JIS L 0842-1971). Similarly, a dyed cloth showing a similar color, having similar fluorescence and light fastness was obtained by using, instead of compound No. 16 mentioned above, compounds Nos. 4, 13, 14, 15, 17, 18 and 24 respectively.

EXAMPLE 2

1 part of finely granulated sample of compound No. 8 (4,7-Dimethylthioindigo) obtained in the same manner as described in Example 1, was dispersed in 20 parts of water containing 0.04 part of a polyoxyethylene alkyl ether type surface active agent.

A polyester cloth was dipped in this aqueous dispersion and impregnated with the dispersion at a pick up of 40–50%. This treated cloth was dried, heat treated at 180°C. for 1 minute, washed with a dilute surface active agent solution and was water-washed and dried to provide a dyed cloth of clear bluish pink color having a red fluorescence and light fastness 5th grade (JIS L 0842-1971).

Similarly, a dyed cloth showing a similar color, having similar fluorescence and light fastness was obtained by using, instead of compound No. 8 mentioned above, compound Nos. 19, 20, and 21 respectively.

EXAMPLE 3

An aqueous dispertion of compound No. 16 was provided in the same way as described in Example 1. Then, a color paste of the following recipe was printed in a pattern on a polyester cloth.

| | |
|---|---|
| Dispersion of dyes in Example 1 | 3 parts |
| Water | 86 parts |
| Stock thickening | 60 parts |
| Anti reductant | 1 part |
| (Stock thickening was prepared as follows: | |
| Neugen ET | 1 part |
| (surface active agent made by Daiichi-Kogyo-Seiyaku K.k.) | |
| Water | 14 parts |
| Turpentine oil | 35 parts |
| 5% Sodium alginate water solution | 50 parts |
| was thoroughly mixed in half emulsion.) | |

The printed cloth was steam-heated at 150° to 180°C. for 3 to 5 minutes in a high temperature steamer, washed with a dilute solution of a surface active agent and was water washed and dried. The pattern of the cloth obtained showed a clear pink color, and its dyeing fastness characteristics were similar to those of the dyeings obtained in Example 1.

EXAMPLE 4

In the same manner as described in Example 1, instead of compound No. 16 above mentioned, compound No. 1 was treated with a polyester cloth, a clear bluish pink colored cloth having similar fastness was obtained. Instead of the polyester cloth, a polyamide cloth was treated at 98°C. or an acetate cloth was treated at 80°C to obtain respectively the same effect as obtained with the polyester cloth.

EXAMPLE 5

A uniform mixture consisting of 0.1 part of compound No. 25 (6-Methoxy thioindigo), 50 parts of polyvinylchloride and 50 parts of dioctylphthalate was kneaded at 150°C, for 10 minutes and was then pressed for 5 minutes between metal plates heated to 160°C. to make a sheet with a thickness of about 0.5 mm.

The sheet obtained showed a clear reddish orange color emitting an orange fluorescence.

Similarly, colored sheet showing similar clear color was obtained by using, instead of the above mentioned compound, compound Nos. 26 and 27 respectively.

EXAMPLE 6

20 parts of an unmodified melamine formaldehyde resin was mixed into 50 parts of sulfonamide resin melted at 120°C.

The resulting mixture was heated to 70°–180°C. and 1 part of compound No. 11 (4,5-Tetramethylene-thioindigo) was mixed with the above mixture.

The mixture was completely dissolved, then cooled, solidified and then crushed to obtain a violet red fluorescence pigment emitting a red fluorescence.

Similarly, a pigment showing a similar color, emitting similar fluorescence was obtained by using, instead of compound 11 mentioned above, compound Nos. 5, 6, 7, 9, 22 and 23 respectively.

EXAMPLE 7

1 part of compound No. 28 (4-Methyl-7-methoxy-thioindigo) was added to 1000 parts of polystyrene, kneaded at 180°C. for a few minutes and was then pressed to a plate 5 mm thick.

The polystyrene plate obtained showed a reddish violet color with red fluorescence. Similarly, a colored plate showing a similar color with similar fluorescence was obtained by using instead of compound No. 28 mentioned above, Compound Nos. 30, 33 and 34 respectively.

What is claimed is:

1. In a method of coloring synthetic or semisynthetic organic high molecular weight material in brilliant nuance with characteristic fluorescence by (A) fixation of the coloring material on the synthetic or semisynthetic high molecular weight organic material by (i) heating the organic material in an aqueous dispersion of the coloring material; (ii) printing the coloring material onto the organic material; or (iii) impregnating the organic material with an aqueous dispersion of the coloring material; or (B) admixing the coloring material with the molten synthetic or semisynthetic high molecular weight organic material, the improvement comprising using as said coloring material an asymmetric thioindigoid compound having the formula:

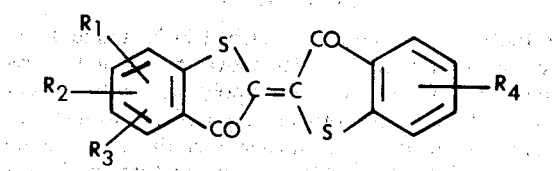

wherein $R_1$, $R_2$ and $R_3$ may be the same or different and are selected from the group consisting of a hydrogen atom, chlorine atom, lower alkyl group, lower alkoxy group, cyclohexyl group, phenyl group, tolyl group, chlorophenyl group, benzyl group, methylbenzyl group, chlorobenzyl group and styryl group, $R_1$ and $R_2$ may together form a tetramethylene ring, $R_4$ is a member selected from the group consisting of a hydrogen atom and methyl group with the proviso that $R_4$ is a methyl group when $R_1$, $R_2$, and $R_3$ are each a hydrogen atom and $R_4$ is a hydrogen atom when $R_1$ is a methyl group and $R_2$ and $R_3$ are each a hydrogen atom.

2. The method as claimed in claim 1, wherein $R_2$, $R_3$ and $R_4$ are each a hydrogen atom and $R_1$ is a member selected from the group consisting of a lower alkyl group, lower alkoxy group, cyclohexyl group, phenyl group, tolyl group, chlorophenyl group, benzyl group, methylbenzyl group, chlorobenzyl group and styryl group.

3. The method as claimed in claim 2, wherein $R_1$ is a member selected from the group consisting of a methyl group, ethyl group, isopropyl group, tert.-butyl group, methoxy group, ethoxy group, cyclohexyl group, phenyl group, tolyl group, chlorophenyl group, benzyl group, methylbenzyl group and chlorobenzyl group.

4. The method as claimed in claim 3, wherein the asymmetric thioindigoid compound has the formula:

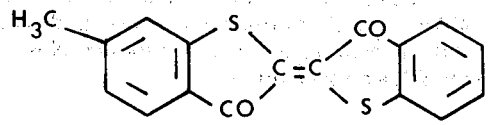

5. The method as claimed in claim 3, wherein the asymmetric thioindigoid compound has the formula:

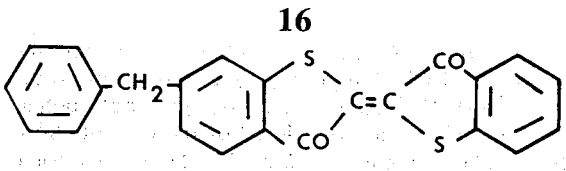

6. The method as claimed in claim 3, wherein the asymmetric thioindigoid compound has the formula:

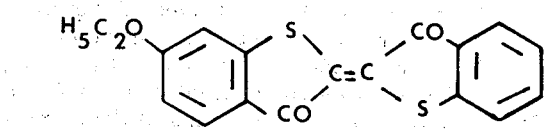

7. The method as claimed in claim 1, wherein $R_3$ and $R_4$ are each a hydrogen atom, $R_1$ is a member selected from the group consisting of a methyl group, ethyl group, isopropyl group, tert.-butyl group, methoxy group, ethoxy group, cyclohexyl group, phenyl group, tolyl group, chlorophenyl group, benzyl group, methylbenzyl group and chlorobenzyl group and $R_2$ is a member selected from the group consisting of a methyl group, ethyl group, isopropyl group, tert.-butyl group, methoxy group and ethoxy group.

8. The method as claimed in claim 7, wherein the asymmetric thioindigoid compound has the formula:

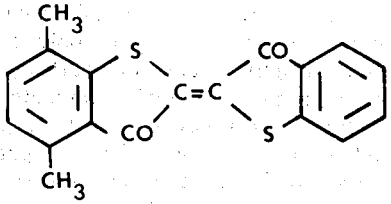

9. The method as claimed in claim 7, wherein the asymmetric thioindigoid compound has the formula:

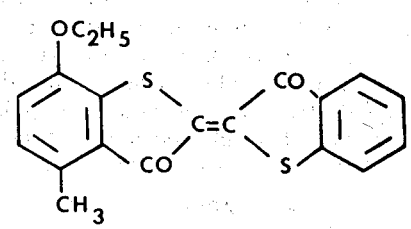

10. The method as claimed in claim 1, wherein $R_3$ and $R_4$ are each a hydrogen atom and $R_1$ and $R_2$ together form a tetramethylene ring.

11. The method as claimed in claim 1, wherein $R_4$ is a hydrogen atom, $R_1$ is a methoxy group and $R_2$ and $R_3$ are each a methyl group.

12. The method of claim 1 wherein said organic material is a polyester.

13. A synthetic or semisynthetic organic high molecular weight material having brilliant nuance and characteristic fluorescence comprising a synthetic or semisynthetic high molecular weight organic material colored with an asymmetric thioindigoid dyestuff having the formula

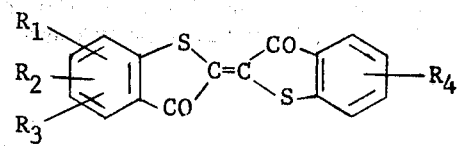

wherein $R_1$, $R_2$ and $R_3$ may be the same or different and are selected from the group consisting of a hydrogen atom, chlorine atom, lower alkyl group, lower alkoxy group, cyclohexyl group, phenyl group, tolyl group, chlorophenyl group, benzyl group, methylbenzyl group, chlorobenzyl group and styryl group, $R_1$ and $R_2$ may together form a tetramethylene ring, $R_4$ is a member selected from the group consisting of a hydrogen atom and methyl group with the proviso that $R_4$ is a methyl group when $R_1$, $R_2$ and $R_3$ are each a hydrogen atom and $R_4$ is a hydrogen atom when $R_1$ is a methyl group and $R_2$ and $R_3$ are each a hydrogen atom.

14. The colored organic material of claim 13 wherein $R_2$, $R_3$ and $R_4$ are each a hydrogen atom and $R_1$ is a member selected from the group consisting of a lower alkyl group, lower alkoxy group, cyclohexyl group, phenyl group, tolyl group, chlorophenyl group, benzyl group, methylbenzyl group, chlorobenzyl group and styryl group.

15. The colored organic material of claim 14 wherein $R_1$ is a member selected from the group consisting of a methyl group, ethyl group, isopropyl group, tert.-butyl group, methoxy group, ethoxy group, cyclohexyl group, phenyl group, tolyl group, chlorophenyl group, benzyl group, methylbenzyl group and chlorobenzyl group.

16. The colored organic material of claim 15 wherein the asymmetric thioindigoid compound has the formula:

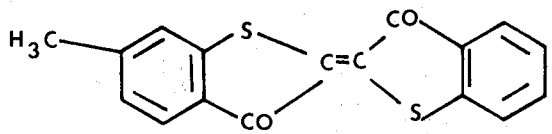

17. The colored organic material of claim 15 wherein the asymmetric thioindigoid compound has the formula:

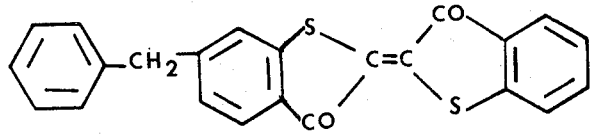

18. The colored organic material of claim 15 wherein the asymmetric thioindigoid compound has the formula:

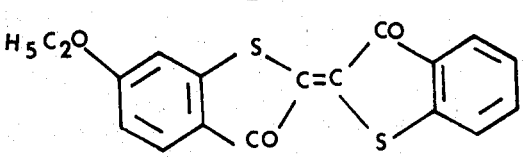

19. The colored organic material of claim 13 wherein $R_3$ and $R_4$ are each a hydrogen atom, $R_1$ is a member selected from the group consisting of a methyl group, ethyl group, isopropyl group, tert.-butyl group, methoxy group, ethoxy group, cyclohexyl group, phenyl group, tolyl group, chlorophenyl group, benzyl group, methylbenzyl group and chlorobenzyl group and $R_2$ is a member selected from the group consisting of a methyl group, ethyl group, isopropyl group, tert.-butyl group, methoxy group and ethoxy group.

20. The colored organic material of claim 19 wherein the asymmetric thioindigoid compound has the formula:

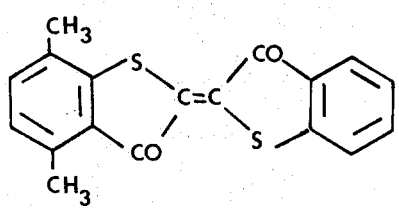

21. The colored organic material of claim 19, wherein the asymmetric thioindigoid compound has the formula:

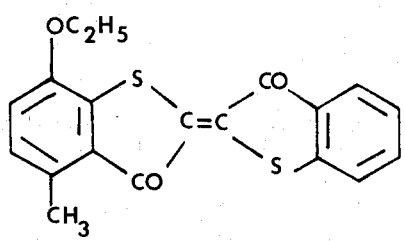

22. The colored organic material of claim 13, wherein $R_3$ and $R_4$ are each a hydrogen atom and $R_1$ and $R_2$ together form a tetramethylene ring.

23. The colored organic material of claim 13 wherein $R_4$ is a hydrogen atom, $R_1$ is a methoxy group and $R_2$ and $R_3$ are each a methyl group.

24. The colored organic material of claim 13 wherein said organic material is a polyester.

* * * * *